United States Patent [19]
Denber et al.

[11] Patent Number: 5,250,934
[45] Date of Patent: Oct. 5, 1993

[54] METHOD AND APPARATUS FOR THINNING PRINTED IMAGES

[75] Inventors: Michel J. Denber; Henry P. Jankowski, both of Rochester, N.Y.

[73] Assignee: Xerox Corporation, Stamford, Conn.

[21] Appl. No.: 636,395

[22] Filed: Dec. 31, 1990

[51] Int. Cl.$^5$ ............................................. G09G 1/06
[52] U.S. Cl. ..................... 345/136; 382/55; 358/456; 345/189; 345/197; 345/143
[58] Field of Search ............ 382/54, 55; 340/728, 340/730, 735, 793; 358/453, 486, 458 X, 463, 447, 445

[56] References Cited

U.S. PATENT DOCUMENTS

| | | | |
|---|---|---|---|
| 3,846,754 | 11/1974 | Oka et al. | 382/55 |
| 4,010,446 | 3/1977 | Kawa | 382/55 |
| 4,204,232 | 5/1980 | Mizuno | 382/55 |
| 4,517,604 | 5/1985 | Lasher et al. | 358/262 |
| 4,531,120 | 7/1985 | Brownwell et al. | 340/723 |
| 4,665,551 | 5/1987 | Sternberg et al. | 382/54 |
| 4,688,031 | 8/1987 | Haggerty | 340/793 |
| 4,780,711 | 10/1988 | Doumas | 340/728 |
| 4,851,825 | 7/1989 | Naiman | 340/728 |

Primary Examiner—Ulysses Weldon
Assistant Examiner—Matthew Luu
Attorney, Agent, or Firm—Kenyon & Kenyon

[57] ABSTRACT

A method and apparatus are shown for improving bit-image quality in video display terminals and xerographic processors. In one embodiment, each scan line of a source image is ANDed with the scan line above to remove half-bits and thin halftones. In other embodiments, entire blocks of data are processed by bit-block transfer operations, such as ANDing a copy of the source image with a copy of itself shifted by one bit. Also, a source image can be compared to a shifted copy of itself to locate diagonal lines in order to place gray pixels bordering these lines.

9 Claims, 7 Drawing Sheets

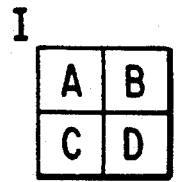
FIG. 6a
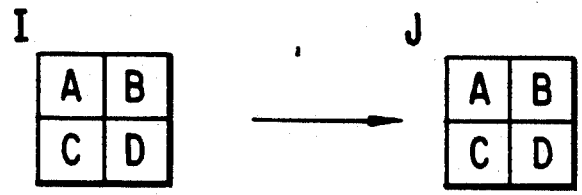
FIG. 6b
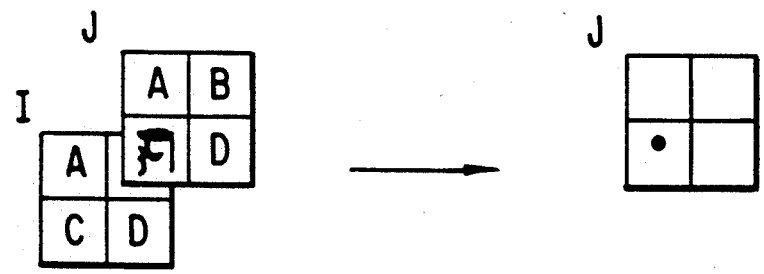
FIG. 6c
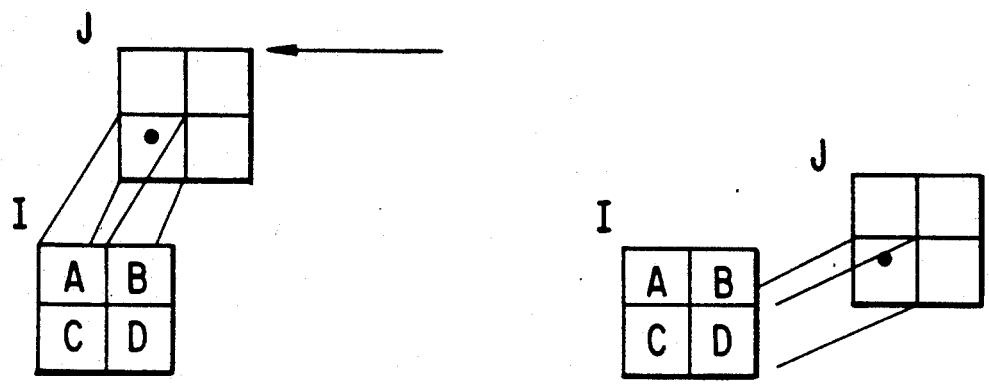
FIG. 6d
FIG. 6e

METHOD AND APPARATUS FOR THINNING PRINTED IMAGES

BACKGROUND OF THE INVENTION

The present invention relates to a method and an apparatus for improving bit-images in printing and video display devices, and more particularly to a method and an apparatus for thinning bitmap images with parallel bit-block transfer operations.

Previously, there have been several methods disclosed to improve bit-image quality. For example, in U.S. Pat. No. 4,517,604 to Lasher et al., a method for reducing line width variations in bilevel video images is described. In this method, print element (pel) data is scanned into two arrays. The first array is scanned row by row to identify any black or white pel runs. White or black pels in the second array are overwritten with gray pels as a function of the pel runs identified in the first array. The method is then repeated column by column. The resulting second array will have reduced line width variations than in the first array.

In U.S. Pat. No. 4,531,120 to Brownwell, Jr. et al., a method for superposing one graphic pattern on another is described. A computer is programmed to produce contoured intermediate arrays for a dominant graphic. These arrays are used to mask the array of an inferior graphic to produce a partial array. The partial array is DOT ORed with the dominant graphic to produce superposed graphics separated by a background space contoured to the dominant graphic.

In U.S. Pat. No. 4,688,031 to Haggerty, a method of converting color images to monochromatic images is described. In this method, the original background of a character is transformed into a monochromatic color pattern mask and the foreground is transformed into a dark field if the background color is white, or the foreground is transformed into a white field if the background color is dark.

In U.S. Pat. No. 4,780,711 to Doumas, an assumed boundary lines method is shown. In this method, an array of pixels in an image is selected and compared to a plurality of predetermined pixel array patterns. When a match is found, an assumed contour line is determined running through the array. The intensity of the center pixel of the array is chosen based on the angle of the assumed line through the array.

In U.S. Pat. No. 4,851,825 to Naiman, a grayscale character generator and method is shown. A master array is convolved with a filter array to determine the placement of gray pixels. The placement of a gray pixel in a certain area is determined by analyzing pixel data around this area using rectangular windows.

A method for the removal of jagged edges in diagonal lines is a process called spatial filtering. In this process, a processor is used to simulate a flying spot scanner. This type of scanner employs a moving spot of light that passes over a document and detects the intensity of the light reflected from the document. As an alternative, the source image can be effectively resampled with each bit in the output being the average value of the area illuminated by a "spot" at a given time. The "spot" is simulated by a spatial filter which comprises a set of values for each bit of the filter. These values can be either identical or computed according to a weighting function.

The filter is overlaid on the image at different areas. At each step, an output value is computed from the weighted average of the bits under the filter. This output value is then used to form a new bitmap for output to a device such as a xerographic processor. A problem with this method is that in font processing, for example, the spatial filtering may modify vertical and horizontal lines in characters. Raster scan output devices such as CRTs and printers print vertical and horizontal lines without aliasing, thus modifying these lines may cause a degradation of quality.

One of the deficiencies of the aforementioned methods and devices for improving bit-image quality is the amount of processing time and effort required for implementation. Another deficiency in previous methods is their complexity.

SUMMARY OF THE INVENTION

The present invention overcomes the aforementioned deficiencies in previous bit-image quality improvement methods and devices. An image generation unit generates a source image that contains bit-image data. This source image is transmitted to a processor as a succession of scan lines. To remove half-bits and to lighten halftones, a first shift register is preloaded with all "on" bits and the first scan line is logically ANDed with the contents of the first shift register while being shifted into this shift register. Alternatively, subsequent scan lines can be shifted into a second shift register and logically ANDed with the contents of the first shift register. Furthermore, a third shift register can be added so that a bit is not turned off if the bit above and the three adjacent bits below the bit are all off, thus preventing the removal of horizontal lines having the width of a single bit. The process repeats itself until the entire source image has been processed. The resulting image is transmitted as it is being processed to a video display terminal or raster output scanner which converts the resulting image to output signals for an output device such as a xerographic processor.

For thinning lines and removing half-bits, the aforementioned method can be modified by first storing at least a portion of the source image in a first memory buffer and logically ANDing that image with a copy of the source image that has been shifted (e.g. one bit to the right, or one bit down). In a different method, the source image can be copied into a second memory buffer. The image in the second buffer is then inverted, shifted one bit upward, ANDed with the source image, and stored in the second memory buffer. The image in the second memory buffer is then shifted to the right one bit, ANDed with the source image, and stored in the second memory buffer. The image in the second memory buffer is then shifted to the left one bit, ANDed with the source image, and stored in the second memory buffer. Finally, the images in the first and second memory buffer are ORed together and transmitted to the raster output scanner.

Another method for improving bit-image quality is by detecting diagonal lines and placing gray pixels in adjacent bits. The source image is stored in a first memory buffer, where each pixel in the buffer represents either an on or an off value. The source image is copied into a second memory buffer and a multi-bit per pixel output buffer. Then the image in the first memory buffer is shifted to the right and upward by one bit, ANDed with the image in the second memory buffer and stored in the second memory buffer. The image in the second memory buffer is shifted to the left one bit and ORed with the image in the output memory buffer. If a bit is on in the first memory buffer and its corresponding bit is on in the second memory buffer, then the bit in the first memory buffer remains on. If a bit is off in the first memory buffer and on in the second memory buffer, then the bit in the first memory buffer is changed to an intermediate value. The image in the second memory buffer is shifted one bit downward and to the right and ORed with the image in the output memory buffer. This process anti-aliases diagonals that run from the bottom left to the top right of the source image. The process can then be repeated to anti-alias diagonals that run from the bottom left to the top left of the source image.

The present invention has the advantage of correcting bit-images quickly. Also the method of the present invention is simple in nature and can be easily implemented in an image processing system.

The above is a brief description of some deficiencies in disclosed bit-image quality improvement methods and devices and advantages of the present invention. Other features, advantages and embodiments of the invention will be apparent to those skilled in the art from the following description, accompanying drawings and appended claims.

BRIEF DESCRIPTION OF THE DRAWINGS

FIG. 3a-b is a graphical representation of the comparison of adjacent bits in a source image according to the present invention;

FIGS. 6a-e are graphical representations of bit-images and the logic operations performed on them according to the present invention.

DETAILED DESCRIPTION

Figure 1:
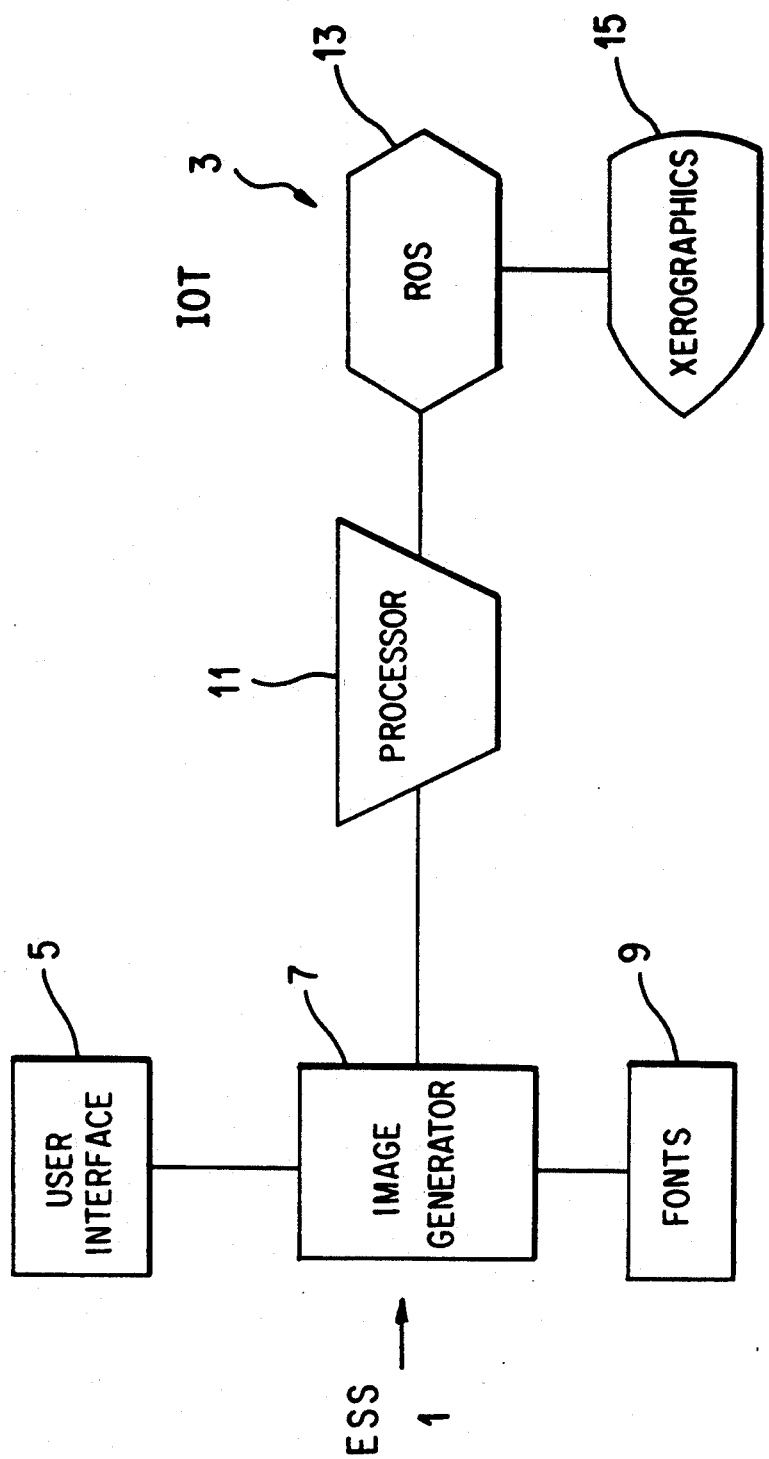
FIG. 1 is a block diagram of the image processing system constructed according to the present invention.

Referring to FIG. 1, the image processing system of the present invention is shown. This system comprises an electronic subsystem ESS 1 and an image output terminal IOT 3, which are common components of an output device such as a xerographic printer. The ESS 1, which is also known as an image processing system, includes an image generation unit 7 coupled to a user interface 5 and a font library unit 9. The image generation unit 7 receives from the user interface 5, or from a memory device, image data encoded in ASCII or any of a variety of coding schemes. This image can be either text or graphics data. The image generation unit 7 converts this image data into binary pixel data in accordance with the appropriate font selected from the font library unit 9. In this embodiment, the image generation unit 7 will generate one bit for each picture element (pixel), therefore, each pixel can be either on or off. The generated image is sent in the form of a bit stream to the IOT 3.

The IOT 3 includes a processor 11, a gray-writing raster output scanner or ROS 13, and a bit-image output device, which is a xerographic processor 15, in this embodiment. The output device could also be a video display terminal. The processor 11 is coupled to the image generation unit 7 of the ESS 1. The processor 11 receives the bit stream from the image generation unit 7 and modifies this bit stream by either converting one bit per pixel data to multiple bit per pixel data (for gray writing output devices) and/or correcting bit-errors in the source image.

Many fonts add half-bits to vertical and horizontal lines in characters by alternating on and off bits along a line edge. These half-bits tend to blend when printed making vertical and horizontal lines appear wider by one-half the width of a bit. A common problem for write-black xerographic bit-image output devices using write-white fonts is the distinct output of half-bits on line edges (i.e. the half-bits tend not to blend together giving the vertical and horizontal lines a jagged appearance). In write-black printers using write-black fonts, half-bitting can make vertical and horizontal lines too thick. By removing half-bits completely in the processor 11, these errors can be corrected.

Figure 2:
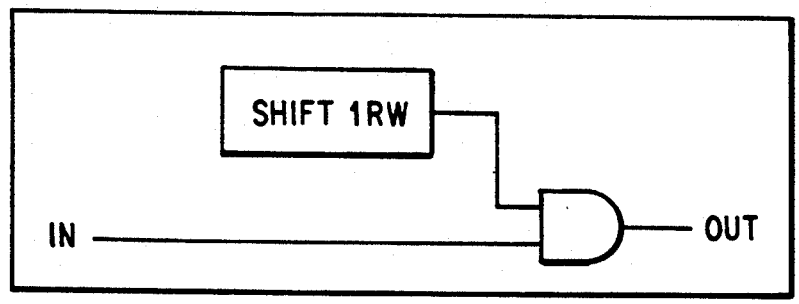
FIG. 2 is a circuit diagram of a device for ANDing two successive scan lines of an image.

To perform this procedure the processor includes, generally, a scan line shift register and an AND gate. The sole shift register is first pre-loaded with all "on" bits and has one bit for each pixel of a scan line. Each bit in the bit stream received from the image generation unit 7 is shifted into the sole shift register and ANDed in a logical AND gate with the bit being shifted out of the shift register. The circuit is shown generally in FIG. 2. When a bit is received from the image generation unit 7, it is ANDed with the bit appearing one raster scan line above it in the source image. This results in a thinning of the image as well as half-bit removal and produces significant improvements in the perceived quality of write-white fonts printed on write-black printers. This method can be modified by including two shift registers of the same length coupled in series. The outputs of each shift register are ANDed together, achieving the same result. Furthermore, This method can be performed in software by using the BITBLT (bit-block transfer) instruction, which will be discussed later.

Figure 3A:
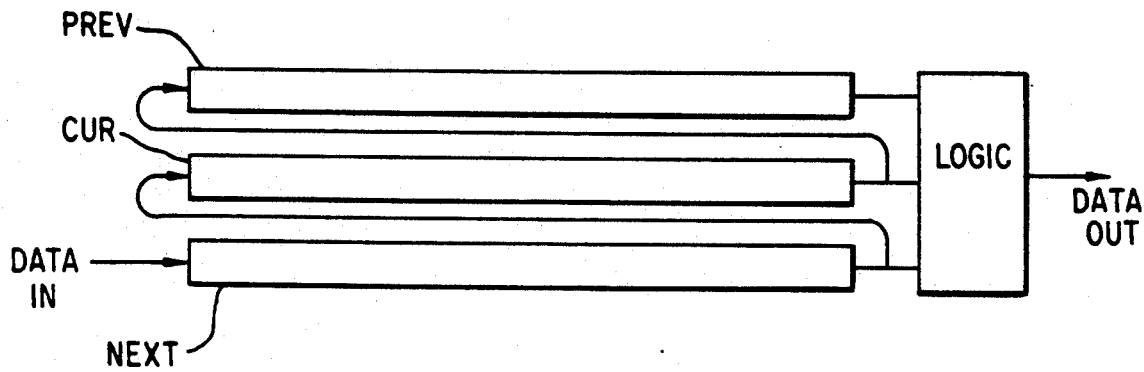
FIG. 3a is a block diagram for comparing 3 successive scan lines of an image.
Figure 3B:
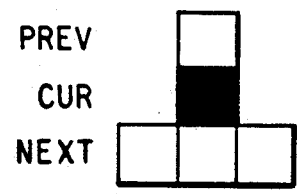

A drawback of the aforementioned circuit is that horizontal lines having a width of a single bit are deleted. To overcome this drawback three scan line shift registers can be used labeled PREV, CUR, and NEXT as shown in FIG. 3a. The PREV register is first pre-loaded with all "on" bits. Then, the first scan line of bit data from the image generation unit 7 is shifted into the CUR register. The next scan line of bit data is shifted into the NEXT register. Each pixel in the CUR register is ANDed with the corresponding bit in the PREV register. If the bit in CUR is on and the corresponding bit in PREV is off, then the CUR bit is only turned off if the three bits adjacent to the CUR bit in the NEXT register are all off. The configuration of the bits is shown generally in FIG. 3b. Continuously, scan line data is shifted into the NEXT register while the data shifted out of NEXT is shifted into the CUR register. Data shifted out of the CUR register is shifted into the PREV register and the data shifted out of the PREV register is discarded. This method is repeated for each scan line of the source image. After the last scan line has been shifted into the NEXT register, off bits are then shifted into this register, so that the last scan line in CUR can be processed correctly.

Figure 4A:
FIGS. 4a-e are prints of bitmaps processed with a method of the present invention.
Figure 4B:
Figure 4E:
Figure 4D:
Figure 4C:

This process has good results with halftones, causing an overall lightening of the perceived density of the bit-image while preserving the overall tone balance. Referring to FIG. 4a, a sample 300 spi bitmap of a halftoned photograph is shown. In FIG. 4b, the same bitmap is shown after being processed according to the present invention. In FIG. 4c, an actual print is shown of the bitmap of FIG. 4a on a write-white printer. In FIG. 4d, an actual print is shown of the bitmap in FIG. 4a on a write-black printer, and FIG. 4e shows an actual print of the bitmap of FIG. 4b on a write-black printer after processing according to the invention.

Figure 5A:
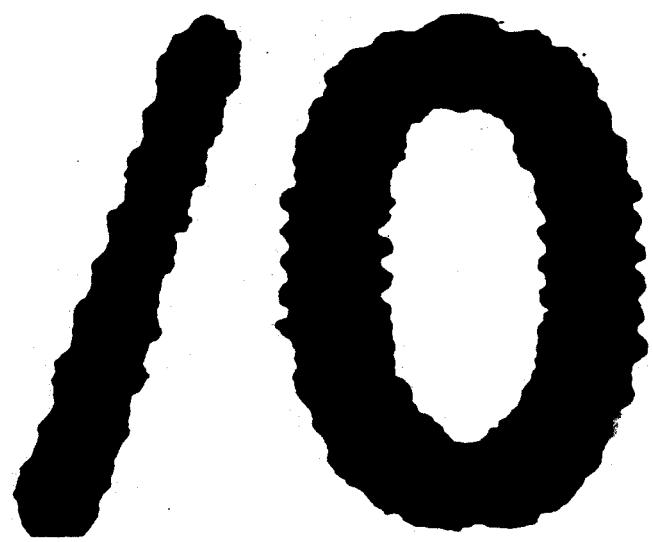
FIGS. 5a-d are actual prints of bitmaps and bitmaps themselves for write-black printers.
Figure 5B:
Figure 5C:
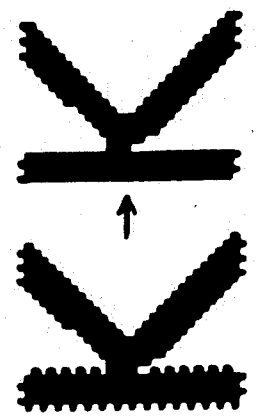
Figure 5D:
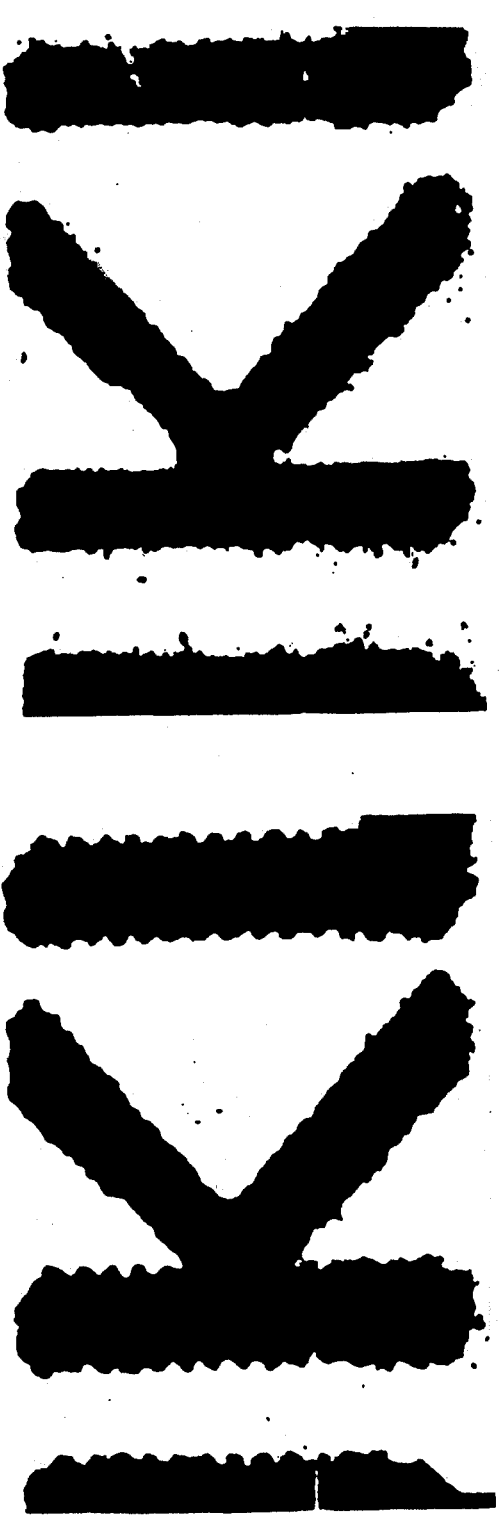

Write-black printers have the characteristic of enlarging printed pixels compared to write-white printers. Referring to FIG. 5a, a print of the "/" and "0" characters is shown from a write-black printer using a write-white font. In FIG. 5b, a print of the same characters is shown from a write-white printer. The characters in FIG. 5a are noticeably thicker than the characters of FIG. 5b. Also, half-bits in FIG. 5a are quite pronounced. In FIG. 5a, the thickening of lines in the horizontal and vertical direction is noticeably different, specifically, there is a 15 to 20 percent increase in thickness in the horizontal direction and ,approximately a 1 percent increase in thickness in the vertical direction. In a method of the present invention, write-white font characters with half-bitting in write-black printers can be corrected. The entire process comprises one call to the BITBLT (bit-block transfer) instruction which is common in all Xerox D Series computers and other commercially available graphics microprocessors such as the Texas Instruments 34010. The code, in Interlisp-D syntax is as follows:
(BITBLT I 0 0 I 0 1 NIL NIL 'INVERT 'ERASE)
The original or source image bitmap should be placed in the I buffer. The BITBLT instruction shifts the bitmap in I one pixel vertically upward and logically ANDs the shifted bitmap in I with itself. The resulting bitmap is placed in I. As seen in FIG. 5c, the bitmap on the right is the result of processing the bitmap on the left using the aforementioned BITBLT instruction. The half-bits appearing along the left and right vertical edges of the character have been removed. Also, the diagonal lines of the character have been reduced in width by one bit. These effects are readily seen in FIG. 5d, which shows the printed characters of the bitmaps of FIG. 5c on a write-black printer. This method slightly reduces the character height and preserves the angles of the diagonal strokes of the character.

If additional vertical thinning is desired or if the write-white font does not include half-bitting, the following BITBLT instruction can be performed:
(BITBLT I 0 0 I 1 1 0 NIL NIL 'INVERT 'ERASE)
These types of instructions can be used in many different xerographic processors, image-editing workstations, or in electronic reprographic (ER) machines. Because of the simplicity of the procedure, it can be used in relatively small-scale computational devices. The present method works independently of the size of the bitmap and does not require a look-up table or pattern matching. It does, however, require a memory buffer equal in size to the image being processed. If such an amount of memory is not available, the source image can be processed in pieces.

The aforementioned method will eliminate horizontal lines having the width of a single bit. To correct this problem the following procedure may be used:
(BITBLT I 0 0 J)
(BITBLT J 0 0 J 0 1 NIL NIL 'INPUT 'ERASE)
(BITBLT J 0 0 J 1 0 NIL NIL 'INVERT 'ERASE)
(BITBLT J 1 0 J 0 0 NIL NIL 'INVERT 'ERASE)

The first BITBLT instruction copies the source image that is stored in I into a temporary buffer J. In the second BITBLT instruction, the bitmap in J is shifted vertically upward by one bit, inverted and ANDed with the original bitmap in J. The resulting image in J includes only edge bits. The third BITBLT instruction shifts the bitmap in J to the right by one bit and ANDs it with the prior contents of J. This removes most of the vertical edge bits in J. In the fourth BITBLT instruction, the bitmap in J is shifted one bit to the left and ANDed with the previous contents of J. This removes any remaining vertical edge bits in J. Now only the single bit horizontal lines in the source image are stored in J. The bitmap in I is processed as mentioned before in reference to FIGS. 5c–d. The contents of J can now be ORed with the contents of I, thus restoring any single bit horizontal lines that were removed during the processing of the bitmap in I. A side-effect of the aforementioned process is that the two bits at either end of the horizontal line will be removed. To correct this, the fourth BITBLT routine above can be deleted which will possibly leave extraneous vertical edge bits in the bitmap. Alternatively, a similar type of logic used to identify horizontal lines can be applied to find and extract single isolated bits and horizontal bit pairs.

Another problem in bitmap-images for binary output devices is the representation of diagonal lines. The present invention utilizes the BITBLT instruction for adding gray picture elements (pixels) to images for printing on gray writing printers. Referring to FIG. 6a, a simple 2×2 bitmap, called I, is shown. The bits in the bitmap are labeled A–D. Any of the bits may be on or off, thus the bitmap could contain a diagonal edge. In accordance with the present invention, to correct the jagged appearance of a diagonal line, any bit that is off in I should be turned to an intermediate value between on and off (i.e. gray) when the two four-connected neighbors of that bit are both on. For example, if A were off and B and C were on, then A should be made gray. The on/off state of D would not effect the changing of A.

The method for converting off bits near diagonal lines to gray bits will be described in reference to FIGS. 6b–e. First, a copy of I is stored into J as shown in FIG. 6b. All "off" bits in I represent white pixels while all "on" bits represent black pixels. As seen in FIG. 6c, the result of this operation is the ANDing of bits B and C in I and placing the result in the lower left bit of J (shown as a "*"). Then, J is shifted to the left by one bit and ORed with I. As seen in FIG. 6d, this operation results in adding gray to bit A of I. If bit A is on, then ORing it with a gray bit leaves A on (i.e. black). If the A bit is off, then ORing this bit with a gray bit changes the bit to gray. Next, J is shifted downward one bit and to the right one bit and ORed with I. As seen in FIG. 6e, this operation results in adding gray to bit D in I. As a result of these steps, if B and C are both on, then A and D will be made gray (if originally white).

These steps are then repeated for determining whether B and/or C should be made gray. Briefly, I is copied into J, and J is shifted one bit to the left and one bit up. I and J are ANDed with the result being placed in J. J is then shifted one bit to the right and ORed with I which results in adding gray to bit B. Then, J is shifted down one bit and to the left one bit and ORed with I which results in adding gray to bit C. If A and D are both on, then B and C will be made gray (if originally white).

It should be kept in mind that the use of a 2×2 bitmap in the present embodiment is merely a simple representation of a much larger bitmap. If sufficient memory is available, the entire bitmap can be processed simultaneously using the method of the present invention. Since this method is inherently parallel, it can be implemented in a parallel computer by subdividing the image. Furthermore, the present method could be expanded to provide for multiple gray levels in a bit-image. A sample program, written in Interlisp-D, for adding gray pixels to diagonal lines in accordance with the present invention is listed in the Appendix.

An alternative to spatial filtering by integration is geometric filtering. In this approach, the source image is still scanned by a filter, however, the contents of the filter at any given time are treated as the left-hand side of a potentially arbitrary replacement rule. In other words, for any given pattern being considered, the user may specify exactly what bit, or combination of bits should be placed in the output image to achieve the desired effect. This process can be implemented very efficiently in software on machines with hardware or microcode support for block memory transfers (e.g. BITBLT). This process can also be implemented directly into hardware.

The above is a detailed description of a particular embodiment of the invention. The full scope of the invention is set out in the claims that follow and their equivalents. Accordingly, the claims and specification should not be construed to unduly narrow the full scope of protection to which the invention is entitled.

---

Appendix

```
(LAMBDA(BWINPUT GRAYSHADE)
;; Takes a b/w bitmap and a gray value and adds one bit of that
    gray as anti-aliasing according to the "template-matching
process, Returns an 8-bit color bitmap.
(PROG(INMAP OUTMAP TEMPMAP CTEMPMAP (GRAYSHADE 127))
    ; Initialization
(SETQ INMAP(BITMAPCOPY BWINPUT)) ;; Make a copy of the input.
(BLTSHADE WHITESHADE INMAP) ;; Clear it.
(BITBLT BWINPUT 0 0 INMAP 1 1) ;; Shift it over one to add a
blank border
(SETQ OUTMAP (COLORIZEBITMAP8 INMAP 0 255 8))
(SETQ TEMPMAP (BITMAPCOPY INMAP))
        ; Part 1:
;; 1st AND (diagonally right):
(BITBLT INMAP 0 0 TEMPMAP 1 1 NIL NIL 'INVERT 'ERASE)
;; Make a color copy of it in gray;
(SETQ CTEMPMAP (COLORIZEBITMAP8 TEMPMAP 0 GRAYSHADE 8))
;; Shift left one into output:
(BITBLT CTEMPMAP 1 0 OUTMAP 0 0 NIL NIL 'INPUT 'PAINT)
;; Shift down one into output:
(BITBLT CTEMPMAP 0 1 OUTMAP 0 0 NIL NIL 'INPUT 'PAINT)
        ; Part 2:
(BITBLT INMAP 1 0 TEMPMAP) ;; Set up the buffer again for the
                second pass:
;; 2nd AND (diagonally left):
(BITBLT INMAP 1 0 TEMPMAP 0 1 NIL NIL 'INVERT 'ERASE)
;; Make a color copy of it in gray:
(SETQ CTEMPMAP (COLORIZEBITMAP8 TEMPMAP 0 GRAYSHADE 8))
;; Shift right one into output:
(BITBLT CTEMPMAP 0 0 OUTMAP 1 0 NIL NIL 'INPUT 'PAINT)
;; Shift down one into output:
(BITBLT CTEMPMAP 0 1 OUTMAP 0 0 NIL NIL 'INPUT 'PAINT)
;; Complete
(RETURN OUTMAP)))
```

---

What is claimed is:

1. A method for correcting half-bit errors due to write-white fonts in write-black xerographic and video output devices, comprising:

generating a source image comprising bit-image data in an image generation unit, said source image having half-bit errors due to a write-white font;

transmitting said source image to a processor as a series of binary data for each successive scan line of the source image;

storing in a first shift register in said processor all "on" binary digits, said shift register comprising a series of successive memory locations equal in number to one raster width, an input, and an output, whereby each datum appearing at said input is shifted through each of said successive memory locations to said output;

receiving from said image generation unit said binary data;

shifting each binary datum into said first shift register and performing a logical AND comparison between the same binary datum about to be shifted into said first shift register and the binary datum being shifted out of said first shift register, said logical AND comparison removing said half-bit errors and forming an output binary datum;

transmitting said output binary datum to a raster output scanner and converting said output binary datum to an output signal for an output device; and displaying said output signal at said output device.

2. The method of claim 1, wherein data received from said image generation unit is shifted into a second shift register and the binary datum being shifted out of said second shift register is shifted into said first shift register and performing a logical AND comparison between the binary datum being shifted out said first shift register and said second shift register.

3. A method for improving bit-image quality in xerographic and video display devices, comprising:

generating a source image comprising bit-image data in an image generation unit;

transmitting said source image to a processor as a series of binary data for each successive scan line of the source image;

storing at least a part of said source image in said processor in a first memory buffer;

copying the image data stored in said first memory buffer into a second memory buffer;

shifting the image data in said second memory buffer;

performing a logical AND comparison between the image data in said first memory buffer and said second memory buffer and forming an output image;

transmitting said output image to a raster output scanner and converting said output image to a series of output signals for an output device; and displaying said output signals at said output device.

4. The method of claim 3, wherein in said shifting step, the image data is shifted one bit upward.

5. The method of claim 3, wherein in said shifting step, the image data is shifted one bit to the right.

6. The method of claim 3, wherein in said shifting step, the bit image in the second memory buffer is shifted one bit upward, further comprising:

inverting the bit image in said second memory buffer after said shifting step;

performing a logical AND comparison between the image data in said first memory buffer and said second memory buffer and forming a first resulting image, and storing said first resulting image in said second memory buffer;

shifting the image in the second memory buffer one bit to the right;

performing a logical AND comparison between the image data in said first memory buffer and said second memory buffer and forming a second resulting image, and storing said second resulting image in said second memory buffer;

shifting the image in the second memory buffer one bit to the left; and performing a logical AND comparison between the image data in said first memory buffer and said second memory buffer and forming a third resulting image, and storing said third resulting image in said second memory buffer; and performing a logical OR comparison between the image data in said first memory buffer and said second memory buffer and forming said output image.

7. A method for improving bit-image quality in xerographic and video display devices, comprising:

generating a source image comprising bit-image data in an image generation unit;

transmitting said source image to a processor as a series of binary data for each successive scan line of the source image;

storing at least a part of said source image in said processor in a first memory buffer, said first memory buffer storing at least an on, an off, and an intermediate value;

copying the image data stored in said first memory buffer into a second memory buffer, said second memory buffer storing at least on and off values;

shifting the image data stored in said second memory buffer one bit to the right and one bit upward;

performing a logical AND comparison between the data stored in the first memory buffer and the data stored in the second memory buffer and forming a first resulting image, and storing said first resulting image in said second memory buffer;

shifting the image data stored in the second memory buffer one bit to the left;

performing a logical OR comparison between the image data in said first memory buffer and said second memory buffer and forming a second resulting image, and storing said second resulting image in said first memory buffer, whereby if a bit is on in said first memory buffer and its corresponding bit in said second memory buffer is on then said bit in said first memory buffer remains on, and if a bit is off in said first memory buffer and its corresponding bit in said second memory buffer is on then said bit in said first memory is changed to an intermediate value;

shifting the image data stored in the second memory buffer one bit to the right and one bit downward;

performing a logical OR comparison between the image data in said first memory buffer and said second memory buffer and forming a third resulting image, and storing said third resulting image in said second memory buffer, whereby if a bit is on in said first memory buffer and its corresponding bit in said second memory buffer is on then said bit in said first memory buffer remains on, and if a bit is off in said first memory buffer and its corresponding bit in said second memory buffer is on then said bit in said first memory is changed to an intermediate value;

transmitting said image of said first memory buffer to a raster output scanner and converting said image to a series of output signals for an output device; and displaying said output signals at said output device.

8. The method of claim 8 further comprising:

copying the image data stored in said first memory buffer into a second memory buffer;

shifting the image data stored in said second memory buffer one bit to the left and one bit upward;

performing a logical AND comparison between the data stored in the first memory buffer and the data stored in the second memory buffer and forming a first resulting image, and storing said first resulting image in said first memory buffer;

shifting the image data stored in the second memory buffer one bit to the right;

performing a logical OR comparison between the image data in said first memory buffer and said second memory buffer and forming a second resulting image, and storing said second resulting image in said first memory buffer, whereby if a bit is on in said first memory buffer and its corresponding bit in said second memory buffer is on then said bit in said first memory buffer remains on, and if a bit is off in said first memory buffer and its corresponding bit in said second memory buffer is on then said bit in said first memory is changed to an intermediate value;

shifting the image data stored in the second memory buffer one bit to the left and one bit downward;

performing a logical OR comparison between the image data in said first memory buffer and said second memory buffer and forming a third resulting image, and storing said third resulting image in said second memory buffer, whereby if a bit is on in said first memory buffer and its corresponding bit in said second memory buffer is on then said bit in said first memory buffer remains on, and if a bit is off in said first memory buffer and its corresponding bit in said second memory buffer is on then said bit in said first memory is changed to an intermediate value.

9. A method for correcting half-bit errors due to write-white fonts in write-black xerographic and video output devices, comprising:

generating a source image comprising bit-image data in an image generation unit, said source image having half-bit errors due to a write-white font;

transmitting said source image to a processor as a series of binary data for each successive scan line of the source image;

storing in a first shift register in said processor all "on" binary digits, said shift register comprising a series of successive memory locations equal in number to one raster width, an input, and an output, whereby each datum appearing at said input is shifted through each of said successive memory locations to said output;

preloading in a second shift register data for the first scan line of the source image;

shifting subsequent data into a third shift register, such that each binary datum being shifted out of said third register is shifted into said second shift register and each binary datum shifted out of said second shift register is shifted into said first shift register;

receiving from said image generation unit said binary data;

shifting each binary datum into said third shift register;

logically comparing each binary datum in said second shift register to a corresponding bit in said first shift register and three corresponding adjacent bits in said third shift register to form an output binary datum, such that an on bit in said second shift register is turned off unless said corresponding bit in said first shift register and the three adjacent bits to said on bit in said third shift register are all off;

transmitting said output binary datum to a raster output scanner and converting said output binary datum to an output signal for an output device; and displaying said output signal at said output device.

* * * * *

UNITED STATES PATENT AND TRADEMARK OFFICE
CERTIFICATE OF CORRECTION

PATENT NO.   :  5,250,934
DATED        :  Oct. 5, 1993
INVENTOR(S)  :  Michel J. Denber, et al It is certified that error appears in the above-indentified patent and that said Letters Patent is hereby corrected as shown below:

| Column | Line | |
|--------|------|---|
| 3 | 39 | Delete "actual". |
| 10 | 37 | Change "claim 8" to --claim 7--. |

Signed and Sealed this

Fourteenth Day of June, 1994

Attest:

BRUCE LEHMAN

Attesting Officer

Commissioner of Patents and Trademarks